Patented Dec. 9, 1947

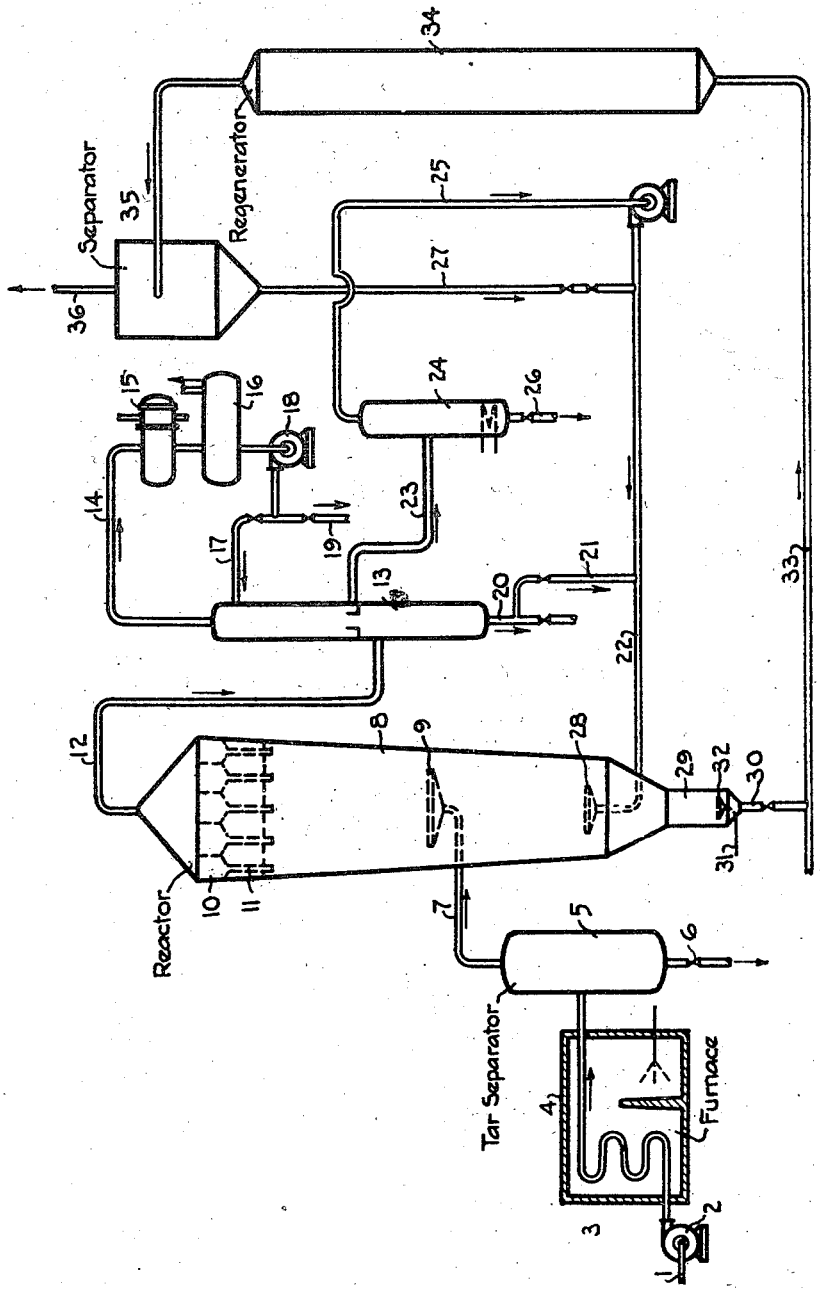

2,432,277

UNITED STATES PATENT OFFICE 2,432,277

CATALYTIC CRACKING OF HYDROCARBON OILS

John M. Brackenbury, Oakland, Calif., assignor to Shell Development Company, San Francisco, Calif., a corporation of Delaware.

Application January 2, 1945, Serial No. 571,101

3 Claims. (Cl. 196—52)

This invention relates to the catalytic cracking of hydrocarbon oils to produce valuable normally gaseous and normally liquid hydrocarbon products of lower molecular weight and boiling range than the oil feed. More particularly the invention relates to catalytic cracking with finely divided cracking catalysts in fluidized or pseudo liquid state wherein the finely divided cracking catalyst is continuously recycled through a cracking zone and through a separate regeneration zone.

In my copending application, Serial Number 547,445, filed July 31, 1944, which has become Patent No. 2,416,608, dated February 25, 1947, of which the present application is a continuation-in-part, there is described a method for effecting various catalytic conversions including catalytic cracking, with finely divided catalysts in fluid catalyst systems wherein the catalyst is continuously recycled through the conversion zone and through a separate regeneration zone. In the method described the material is separated into a more refractory fraction and a less refractory fraction and these fractions are simultaneously treated in a single reaction zone at different space velocities. This is accomplished by charging the more refractory fraction and the fresh catalyst to the bottom of a fluidized bed of the catalyst in the reaction zone and introducing the less refractory fraction at an intermediate point into the said fluidized bed. In a specific embodiment the method is applied for the simultaneous catalytic cracking of a refractory heavy vacuum flashed condensate and a more refractory light naphtha fraction from partly reduced crude petroleum. The process of the present invention makes use of the above described principles in the treatment of specific feed materials and involves, in addition, certain additional findings regarding the refractivity of certain feed stocks and the simultaneous cracking of mixtures of feed materials, which materials per se ordinarily require different treating conditions for optimum results.

In the catalytic cracking of hydrocarbon oils with clay type cracking catalysts it is found that the following principles generally apply:

(1) Higher molecular weight hydrocarbons of any given type are much more susceptible to cracking than lower molecular weight hydrocarbons.

(2) Olefins, in general, are more susceptible to cracking than naphthenes.

(3) Naphthenes are, in general, more susceptible to cracking than paraffins.

(4) Paraffins are, in general, more susceptible to cracking than aromatics.

(5) Aromatics are, in general, quite refractory, particularly the polycyclic aromatic hydrocarbons such as naphthalene.

When a hydrocarbon oil to be cracked, for instance a gas oil, is contacted with the catalyst under suitable cracking conditions, the various materials which are more susceptible to cracking are cracked and there is produced a hydrocarbon mixture containing cracked products of the desired boiling range, for instance gasoline as well as partially cracked products of intermediate boiling range and some unconverted material. The material boiling above the desired boiling range is generally highly aromatic and is more refractory than the initial feed stock, particularly for catalytic cracking. If it is desired to further convert this refractory material it is generally treated by thermal methods, although in a few cases it has been suggested to treat it catalytically under more drastic conditions than those prevailing in the first cracking step. This latter suggestion is not, however, generally used because the large investment and costs incurred by a second catalytic cracking plant for this purpose is prohibitive, and because "blocked out" operation in a single plant cuts down plant capacity, and because the yield and gasoline to carbon ratio are poor.

In the process of the invention this higher boiling more refractory material, or a fraction of it, is recycled and catalytically cracked at essentially the same temperature. Recycle of the higher boiling refractory material leads to particularly favorable results. In the first place, it is found that in spite of the refractory nature of the recycled material, excellent yields of gasoline and other valuable products may be obtained from it without increasing the temperature of the cracking treatment. Furthermore, the presence of this refractory material in the cracking zone with the original feed does not decrease the production of cracked products. In many cases the recycled stock may be catalytically cracked without reducing the throughput capacity of the plant with respect to fresh feed. Furthermore, this operation does not result in any decrease in the gasoline to carbon ratio. Furthermore, practically all of the cracked products from the cracking of the recycled stock boil within the gasoline boiling range. Furthermore, the gasoline produced by cracking the feed stock and the recycled stock simultaneously is of particularly good quality and is superior to the gasoline produced by the catalytic cracking of the original feed alone under the same conditions. For example, when cracking a flashed condensate from a West Texas reduced crude with the commercial synthetic silica-alumina cracking catalyst in a fluid catalyst system under the following conditions:

| | |
|---|---|
| Temperature | 950° F. |
| Pressure | Substantially atmospheric |
| Weight hourly space velocity | 1.0 |
| Catalyst/oil ratio | 10-12:1 | the following products and results were obtained:

| | Per cent by weight |
|---|---|
| Conversion | 65 |
| Debutanized gasoline (325° F.) | 20.0 |
| Normally gaseous hydrocarbons | 29.7 |
| Higher boiling products (325° F.+) | 42.2 |
| Coke | 8.1 |

Various fractions of the 325° F.+ material were separated and recycled in different amounts. When all of the 325-475° F. fraction was recycled (without changing the first feed rate) the following results were obtained:

| | Per cent by weight |
|---|---|
| Conversion | 67 |
| Debutanized gasoline (325° F.) | 29.3 |
| Normally gaseous hydrocarbons | 29.1 |
| Coke | 8.6 |

When 50% of the 600° F.+ material was recycled the following results were obtained:

| | Per cent by weight |
|---|---|
| Conversion | 67 |
| Debutanized gasoline (325° F.) | 27.9 |
| Normally gaseous hydrocarbons | 26.4 |
| Coke | 8.1 |

According to the process of the invention, the higher boiling more refractory material, or a fraction of it, is recycled and catalytically cracked simultaneously with the original feed but at a lower space velocity, i. e., longer contact time. This avoids "blocked out" operation. The lower space velocity is obtained by introducing the recycled material into the bottom of the fluidized bed of finely divided catalyst and introducing the fresh feed at one or more higher (intermediate) points in said bed. The process of the invention will be more particularly described in connection with the attached drawing wherein the more important apparatus and flows of one typical operation are illustrated by conventional figures not drawn to scale. Referring to the drawing the hydrocarbon oil to be cracked, for instance a heavy gas oil, a reduced crude or the like, is fed by pipe 1 and pump 2 through heating coil 3 in a suitable furnace 4. The heated oil passes to a tar separator 5 from which unvaporizable heavy liquid materials may be withdrawn via line 6. The hydrocarbon vapors passed via line 7 to the middle portion of a fluid catalyst reactor 8 filled with a continuously renewed bed of fluidized finely divided cracking catalyst. The incoming vapors are distributed throughout the middle of the catalyst bed by means of a baffled distributor plate 9 or other equivalent means. This arrangement differs from previous cracking processes using powdered catalyst in this respect in as much as in prior processes where the partially spent catalyst is withdrawn from the bottom, the fresh catalyst is introduced with the hydrocarbon feed. The hydrocarbon vapors pass up through the bed of fluidized catalyst and undergo substantial cracking. The cracked vapors passing out of the fluidized catalyst bed tend to carry a small amount of finely divided catalyst in suspension. This suspended catalyst is separated from the hydrocarbon vapors by means of internal separators such as the well known Multiclone separator indicated diagrammatically at 10. The separated catalyst is returned to the catalyst bed by means of standpipes 11 which are of sufficient length to dip below the surface of the fluidized catalyst bed. The vapors pass via line 12 to a fractionating column 13 wherein they are separated into a fraction containing normally gaseous products and cracked gasoline of any desired end point and a heavy fraction. The lighter fraction is taken overhead via line 14 to a condenser 15 and separator 16. Part of the condensate may be recycled via line 17 and pump 18, and the remainder may be withdrawn via line 19 and treated in any conventional manner.

The heavier fraction from column 13 may be removed as a single bottom product or it may be removed as two separate fractions. In such cases where it is desired to fractionate the material into more closely cut fractions, it is desirable to remove the bottom product as two separate fractions. Thus, a fraction of heavy oil containing a small amount of suspended catalyst (which escaped separation in the separator 10) may be withdrawn via line 20. This may be discarded but is preferably cycled via lines 21 and 22 back to the reactor. A clean fraction of the heavy oil may be removed via line 23 and passed to a separate stripper or fractionator 24. In fractionator 24 any desired portion or fraction of the heavy oil, say a 325-475° F. cut may be separated and removed overhead via line 25. The remainder may be withdrawn via line 26 as a product of the process.

The heavy oil in line 25 consists largely of refractory uncracked and/or partially cracked products from the primary cracking step described. This oil picks up hot freshly regenerated catalyst from the regenerated catalyst standpipe 27 and the mixture passes via line 22 to the reactor 8. This mixture is introduced into the reactor at or near the bottom via the distributing baffle arrangement 28. The oil vapors pass up through the fluid catalyst bed and after reaching baffle 9 commingle with the fresh feed introduced as described above.

Partially spent catalyst is continuously withdrawn from the lower end of the reactor 8 via stripping section 29 and standpipe 30. Steam or other suitable gaseous agent is added via line 31 and distributor 32 near the bottom of the stripping section to replace the oil vapors in the fluidized catalyst being withdrawn. The partially spent catalyst withdrawn via 30 is picked up by a stream of regeneration gas, for example, air or a mixture of air and flue gas and carried via line 33 to a conventional regenerator 34. The spent regeneration gas and regenerated catalyst pass to a cyclone separator 35. The spent regeneration gas is withdrawn via line 36 and the regenerated catalyst is withdrawn via standpipe 27.

The process of the invention is applicable for the catalytic cracking of various hydrocarbon oils boiling above the gasoline boiling range. Thus it can be applied in the cracking of naphthas, kerosene distillates, stove oils, and gas oils. These stocks may be catalytically cracked at the usual temperatures in the order of 800° F. to 925° F.

The process is particularly advantageous for the catalytic cracking of heavy stocks such as de-asphaltized reduced crudes, vacuum flashed distillates such as described in my above-mentioned copending application, and other such stocks having an average molecular weight of 280 or above. Such stocks usually contain considerable concentrations of nitrogen compounds, sulfur compounds, oxygen compounds, small amounts of asphaltic substances, waxes etc. They do not, in general, produce the best quality gasoline in once-through catalytic cracking operations and are more advantageously cracked at high temperatures of at least 950° F. to produce large quantities of valuable olefins and a gasoline which can be converted into a first quality product by a simple second treatment such as a re-passing treatment at a lower temperature or a selective hydrogenation treatment.

I claim as my invention:

1. In a process for the catalytic cracking of a hydrocarbon oil to produce valuable normally gaseous and normally liquid hydrocarbon products of lower molecular weight and boiling point in a catalytic cracking system using a fluidized finely divided cracking catalyst, the method of operation comprising the steps of introducing the fresh hydrocarbon oil feed to be cracked at one or more intermediate points into a bed of continuously replenished fluidized finely divided cracking catalyst constituting the cracking zone wherein it is catalytically cracked in the presence of recycle stock introduced as hereinafter specified, continuously withdrawing spent catalyst from said fluidized bed and continuously regenerating said withdrawn spent catalyst in a separate regeneration zone by burning carbonaceous deposits therefrom, separating from the product from said cracking zone by fractionation a lower boiling product fraction and a higher boiling recycle fraction consisting largely of uncracked and partially cracked products of said feed, contacting at least a portion of said higher boiling fraction with the hot freshly regenerated catalyst from said regeneration zone and passing the mixture to said cracking zone by introducing said mixture at the bottom of said bed of fluidized finely divided cracking catalyst, thereby to simultaneously crack said fresh hydrocarbon feed and said recycled fraction in the same bed of fluidized finely divided cracking catalyst at different space velocities while avoiding contact of the said fresh hydrocarbon feed with said hot freshly regenerated catalyst.

2. In a process for the catalytic cracking of a hydrocarbon oil to produce valuable normally gaseous and normally liquid hydrocarbon products of lower molecular weight and boiling point in a catalytic cracking system using a fluidized finely divided cracking catalyst, the method of operation comprising the steps of introducing the fresh hydrocarbon oil feed to be cracked at one or more intermediate points into a bed of continuously replenished fluidized finely divided cracking catalyst constituting the cracking zone wherein it is catalytically cracked in the presence of recycle stock introduced as hereinafter specified continuously withdrawing spent catalyst from said fluidized bed and continuously regenerating said withdrawn spent catalyst in a separate regeneration zone by burning carbonaceous deposits therefrom, separating from the product from said cracking zone by fractionation a lower boiling product fraction and a fraction boiling between about 325 and 475° F. consisting largely of uncracked and partially cracked products of said feed, contacting at least a portion of said 325–475° F. fraction with the hot freshly regenerated catalyst from said regeneration zone and passing the mixture to said cracking zone by introducing said mixture at the bottom of said bed of fluidized finely divided cracking catalyst, thereby to simultaneously crack said fresh hydrocarbon feed and said recycled fraction in the same bed of fluidized finely divided cracking catalyst at different space velocities while avoiding contact of the said fresh hydrocarbon feed with said hot freshly regenerated catalyst.

3. In a process for the catalytic cracking of a hydrocarbon oil to produce valuable normally gaseous and normally liquid hydrocarbon products of lower molecular weight and boiling point in a catalytic cracking system using a fluidized finely divided cracking catalyst, the method of operation comprising the steps of introducing a straight run gas oil having a molecular weight above about 280 at one or more intermediate points into a bed of continuously replenished fluidized finely divided cracking catalyst constituting the cracking zone wherein it is catalytically cracked in the presence of recycle stock introduced as hereinafter specified, continuously withdrawing spent catalyst from said fluidized bed and continuously regenerating said spent catalyst in a separate regeneration zone by burning carbonaceous deposits therefrom, separating from the product from said cracking zone by fractionation a lower boiling product fraction and a higher boiling fraction consisting largely of uncracked and partially cracked products of said feed, contacting at least a portion of said higher boiling fraction with the hot freshly regenerated catalyst from said regeneration zone and passing the mixture to the cracking zone by introducing said mixture at the bottom of said bed of fluidized finely divided cracking catalyst, thereby to simultaneously crack said hydrocarbon feed and said recycled fraction in the same bed of fluidized finely divided cracking catalyst at different space velocities while avoiding contact of the fresh hydrocarbon feed with said hot freshly regenerated catalyst.

JOHN M. BRACKENBURY.

REFERENCES CITED

The following references are of record in the file of this patent:

UNITED STATES PATENTS

| Number | Name | Date |
|---|---|---|
| Re. 21,526 | Odell | Aug. 6, 1940 |
| 2,128,220 | Cooke | Aug. 30, 1938 |
| 2,332,562 | Egloff | Oct. 26, 1943 |
| 2,356,611 | Peters | Aug. 22, 1944 |
| 2,356,697 | Rial | Aug. 22, 1944 |
| 2,360,622 | Roetheli | Oct. 17, 1944 |
| 2,361,138 | Voorhies, Jr. | Oct. 24, 1944 |
| 2,377,613 | Conn | June 5, 1945 |
| 2,379,159 | Kanhofer | June 26, 1945 |
| 2,394,651 | Alther | Feb. 12, 1946 |